(12) United States Patent
Leng et al.

(10) Patent No.: US 8,880,703 B2
(45) Date of Patent: Nov. 4, 2014

(54) ADDRESS DISTRIBUTION METHOD, DEVICE AND SYSTEM THEREOF

(75) Inventors: Tong Leng, Shenzhen (CN); Zhining Ye, Shenzhen (CN); Wei Mao, Shenzhen (CN); Chengxu Zhu, Shenzhen (CN); Lu Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 173 days.

(21) Appl. No.: 13/496,071

(22) PCT Filed: May 11, 2010

(86) PCT No.: PCT/CN2010/072600
§ 371 (c)(1),
(2), (4) Date: Mar. 14, 2012

(87) PCT Pub. No.: WO2011/035588
PCT Pub. Date: Mar. 31, 2011

(65) Prior Publication Data
US 2012/0179826 A1 Jul. 12, 2012

(30) Foreign Application Priority Data
Sep. 23, 2009 (CN) .......................... 2009 1 0178109

(51) Int. Cl.
*G06F 15/16* (2006.01)
*H04L 29/12* (2006.01)

(52) U.S. Cl.
CPC ........ *H04L 61/2076* (2013.01); *H04L 61/2007* (2013.01); *H04L 61/2061* (2013.01)
USPC ......................................... 709/226; 709/223

(58) Field of Classification Search
CPC ................... H04L 29/12283; H04L 29/12216; H04L 61/2061; H04L 61/2007; H04L 69/40

USPC ......... 709/203, 217, 219, 223, 224, 226, 229, 709/245
See application file for complete search history.

(56) References Cited

U.S. PATENT DOCUMENTS

| | | | |
|---|---|---|---|
| 2005/0105529 A1* | 5/2005 | Arberg et al. .............. | 370/395.5 |
| 2005/0114492 A1* | 5/2005 | Arberg et al. ................. | 709/223 |

(Continued)

FOREIGN PATENT DOCUMENTS

| | | |
|---|---|---|
| CN | 1455563 A | 11/2003 |
| CN | 1561072 A | 1/2005 |
| CN | 1754374 A | 3/2006 |

OTHER PUBLICATIONS

XP015001673,"DHCP Failover Protocol", Network Working Group, Internet Draft, Mar. 2003, pp. 1-133.

(Continued)

*Primary Examiner* — Barbara Burgess
(74) *Attorney, Agent, or Firm* — Ling Wu; Stephen Yang; Ling and Yang Intellectual Property

(57) ABSTRACT

An address distribution method is disclosed by the present invention, in which two Broadband Remote Access Servers (BRAS) which are mutually backup devices respectively occupy part of the address resources in a shared address pool, and the method includes: when detecting a user online, a BRAS selecting an address from the corresponding part of address resources in the shared address pool and distributing the address to the user; and the BRAS sending a notification message to the backup device, and informing the backup device of the address occupied by the user. A BRAS and an address distribution system is further disclosed by the present invention, and the problem of address collision generated when a pair of BRASs which are mutually backup devices distribute the addresses to their respective user in the dual-server hot backup scenario is solved by the method, device and system of the present invention.

9 Claims, 3 Drawing Sheets

(56) References Cited

U.S. PATENT DOCUMENTS

2007/0174729 A1* 7/2007 Jiang et al. .................... 714/43
2011/0282998 A1* 11/2011 Johnsson et al. ............. 709/226

OTHER PUBLICATIONS

International Search Report for PCT/CN2010/072600 dated Jul. 26, 2010.

* cited by examiner

ADDRESS DISTRIBUTION METHOD, DEVICE AND SYSTEM THEREOF

TECHNICAL FIELD

The present invention relates to communication field, and more especially, to an address distribution method, device, and system thereof.

BACKGROUND OF THE RELATED ART

The service control layer of broadband metropolitan area network is a unique layer for service access network connecting with the core switched network, and the device which plays an important role is Broadband Remote Access Server (BRAS), which mainly undertakes the functions of service access control and user management.

As the assurance requirements for high quality services provided by the network have been put forward, higher requirements for the performance and reliability of the BRAS products in the service control layer are raised. The functions undertaken by the BRAS products and the locations of the BRAS products in the network determine that the BRAS has the networking with high reliability, therefore, the concept of a dual-server hot backup of the BRAS emerges, which deploys two BRAS devices in the service control layer and makes it possess the functions of the main and standby redundancy and user information backup, so as to guarantee that a switchover and service recovery can be rapidly implemented during the device failure and achieve the service guarantee that they can't be sensed by the users. Meanwhile, the network hazards of the failure in the single point are also thoroughly solved.

The scenario of BRAS dual-server hot backup is deploying two BRAS products in the control layer of the network, and one of the two devices is in a main state and the other is in a standby state while working. The main device is used to control user access and record the user information, and backup the user information to the standby device through a way of real time synchronization or batch synchronization. When the main device is faulted, a main and standby switchover can be implemented rapidly, and since the user information has been stored in the device in standby state as backup, the user has no perceptions in the main and standby switchover process of the devices, which ensures the service quality and enhances the service experience of the user.

In the scenario of dual-server hot backup, there are two kinds of working modes: 1:1 and 1+1. It is assumed that the two BRAS devices are device A and device B, the working mode of 1:1 is targeted at all the users, and the device A is a device in main state and the device B is a device in standby state, that is, only the device A bears user services and the device B doesn't bear the users during the normal operation; the working mode of 1+1 is targeted at one set group of users, the device A is a device in main state and the device B is a device in standby state, and with respect to another set group of users, the device B is the device in main state and the device A is the device in standby state, that is, both the device A and device B bear the user services during the normal operation.

In the scenario of dual-server hot backup, two BRASs which are mutually backup devices have the same shared address pool. When the two BRASs work in the mode of 1+1, the users will gain access from two BRASs respectively and share the distributed addresses in the shared address pool simultaneously. When a certain user is online and obtains an address by distribution, the user information will be synchronized in real time to a remote backup device, and the remote device identifies the IP item in the local address record as unavailable according to the address distributed to the user in the synchronous information.

In the process of implementing the BRAS distributing an address for online user in the above 1+1 working mode, there is a following problem:

when there are users accessing two BRAS devices simultaneously, one BRAS distributes a certain address to a user, and before the BRAS synchronizes the address information of the user to a backup device, the backup device also has the users getting online and distributes the same address to a user, that is, two BRASs which are mutually backup devices distribute the same address for their respective user, which generates the address collision.

SUMMARY OF THE INVENTION

An address distribution method, device, and system thereof are provided by the present invention, which solves the problem of address collision generated when the BRAS distributes an address to a user.

An address distribution method, in which two Broadband Remote Access Servers (BRAS) which are mutually backup devices respectively occupy part of address resources in a shared address pool, which comprises:

when detecting a user online, a BRAS selecting an address from a corresponding part of address resources in the shared address pool and distributing the address to the user; and the BRAS sending a notification message to a backup device of BRAS, and informing the backup device of the address occupied by the user.

The address distribution method further comprises:

formulating address distribution rules respectively for the BRASs which are mutually backup devices, and the address distribution rules defining the address resources distributed to each BRAS.

The step of formulating address distribution rules respectively for the BRASs which are mutually backup devices comprises:

sequencing the addresses in the shared address pool; and defining one BRAS of the BRASs which are mutually backup devices to distribute the addresses for online users in a forward sequence distribution mode and the other BRAS distributes addresses for online users in a reverse sequence mode.

The address distribution method further comprises:

when detecting a user offline, the BRAS releasing the address occupied by the user, and sending the notification message to the backup device, and informing the backup device that the address has been released.

The address distribution method further comprises:

the BRAS receiving the notification message; and if the notification message includes the address distributed for the user, identifying the address distributed for the user as used; or, if the notification message indicates that the address occupied by the user has been released, identifying the address occupied by the user as available.

A BRAS, which comprises:

a local resource management module, configured to: select an address from a corresponding part of address resources in a shared address pool and distribute the address to a user according to address distribution rules when detecting the user online; and a notification message transmitting module, configured to: send a notification message to a backup device and inform the backup device of the address occupied by the user after the local resource management module finishes distributing the address to the user online.

The local resource management module is further configured to: release the address occupied by the user, send the notification message to the backup device through the notification message transmitting module, and inform the backup device that the address has been released when detecting the user offline.

The local resource management module is further configured to: receive the notification message;

if the notification message includes the address distributed for the user, identify the address distributed for the user as used; or if the notification message indicates that the address occupied by the user has been released, identify the address occupied by the user as available.

The above BRAS further comprises:

an address distribution rule formulating module, configured to: formulate the address distribution rules respectively for BRASs which are mutually backup devices, wherein the address distribution rules define the address resources distributed to each BRAS.

An address distribution system, which comprises a first BRAS and a second BRAS which are mutually backup;

the first BRAS is configured to: select an address from a corresponding part of address resources in a shared address pool and distribute the address to the user according to address distribution rules, and send a notification message to the second BRAS and inform the second BRAS of the address occupied by the user, when detecting a user online;

the second BRAS is configured to: receive the notification message sent by the first BRAS, and identify the address distributed for the user as used.

the first BRAS is further configured to: release the address occupied by the user, send the notification message to the second BRAS and inform that the address has been released, when detecting the user offline;

the second BRAS is further configured to: identify the released address as available.

The examples of the present invention provide an address distribution method, device and system thereof, which respectively designate the address distribution rules for a pair of BRASs which are mutually backup devices, and the BRAS distributes address resources in a shared address pool according to the address distribution rules, and when detecting a user online, the BRAS selects an address from a corresponding part of the address resources in a shared address pool which is allocated for the BRAS and distributes the address to the user, and sends a notification message to the backup device and informs the backup device of the address occupied by the user, which solves the problem of address collision generated when a pair of BRASs which are mutually backup devices distribute the addresses to their respective user in the scenario of dual-server hot backup.

PREFERRED EMBODIMENTS OF THE PRESENT INVENTION

In order to solve the problem of address collision generated when a pair of BRASs which are mutually backup devices distribute the addresses to their respective user in the scenario of dual-server hot backup, an address distribution method is provided by the example of the present invention.

Firstly, the application scenarios of the example of the present invention will be introduced.

Figure 1:
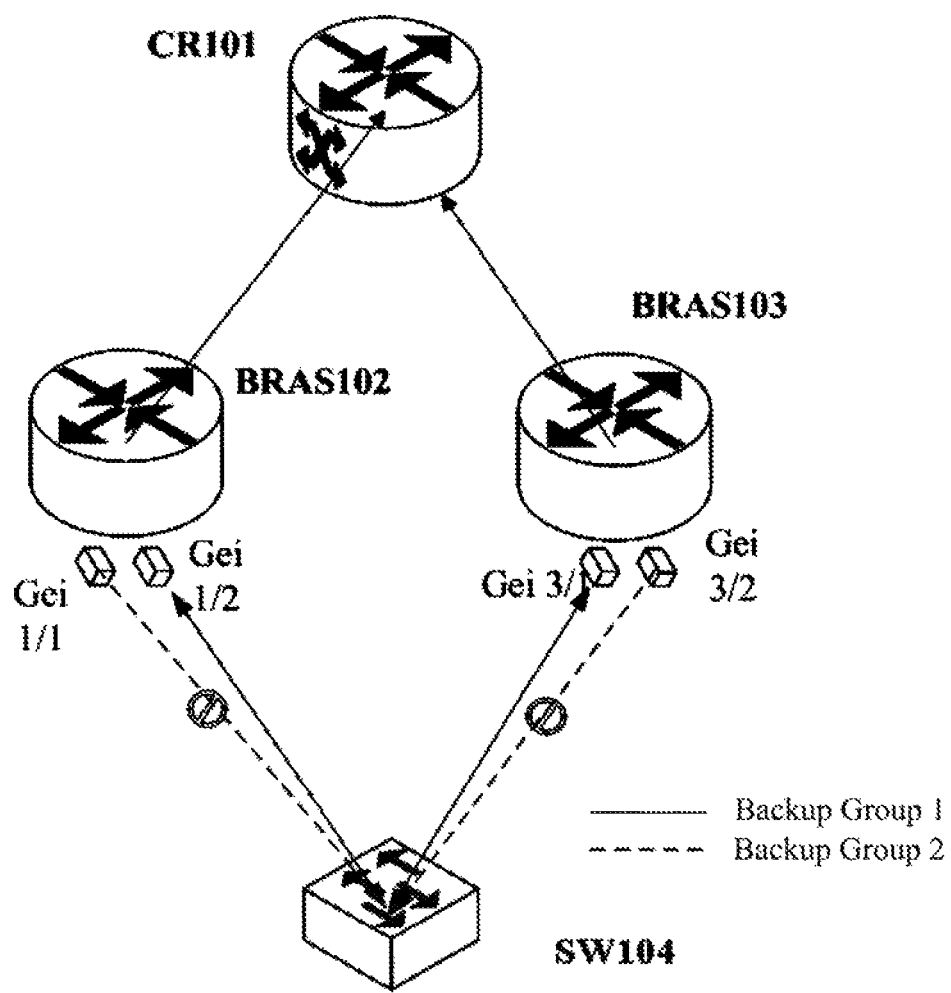
FIG. 1 is a structural schematic diagram of the application scenario of the example according to the present invention.

The application scenario of 1+1 dual-server hot backup working mode is shown in FIG. 1, wherein, the device 1 of the Core Router (CR) 101 is a core device of the metropolitan area network, and the CR101 is connected with BRAS102 and BRAS103, wherein the BRAS102 and BRAS103 are mutually backup devices, two BRAS devices implement the function of dual-server hot backup, and when the BRAS102 and BRAS103 are connected with a switch (SW) 104, a user can access the BRAS through the switch.

In the application scenario of BRAS dual-server hot backup, the user accesses a convergence device though the access network, and the convergence device dually uplinks to two BRAS devices, the BRAS plays a role as a gateway, and the two BRAS devices negotiate the main and standby relation through a Virtual Router Redundancy Protocol (VRRP, refer to RFC2338).

Between the two BRASs which are mutually backup, backups of whole machine level, line card level, port level, virtual sub-interface level can be supported, and a group of minimum abnormal switching units which are mutually backup is called as a backup group. Multiple backup group relations can be established between the main and standby devices, for example, 20 ports of the main devices perform backups with the standby devices one by one and 20 backup groups exist between the devices. Different VRRP examples perform the main and standby election and anomaly detection switchover, and backup groups are detailed, which can effectively control the influence scope of the devices when the failure occurs.

Figure 2:
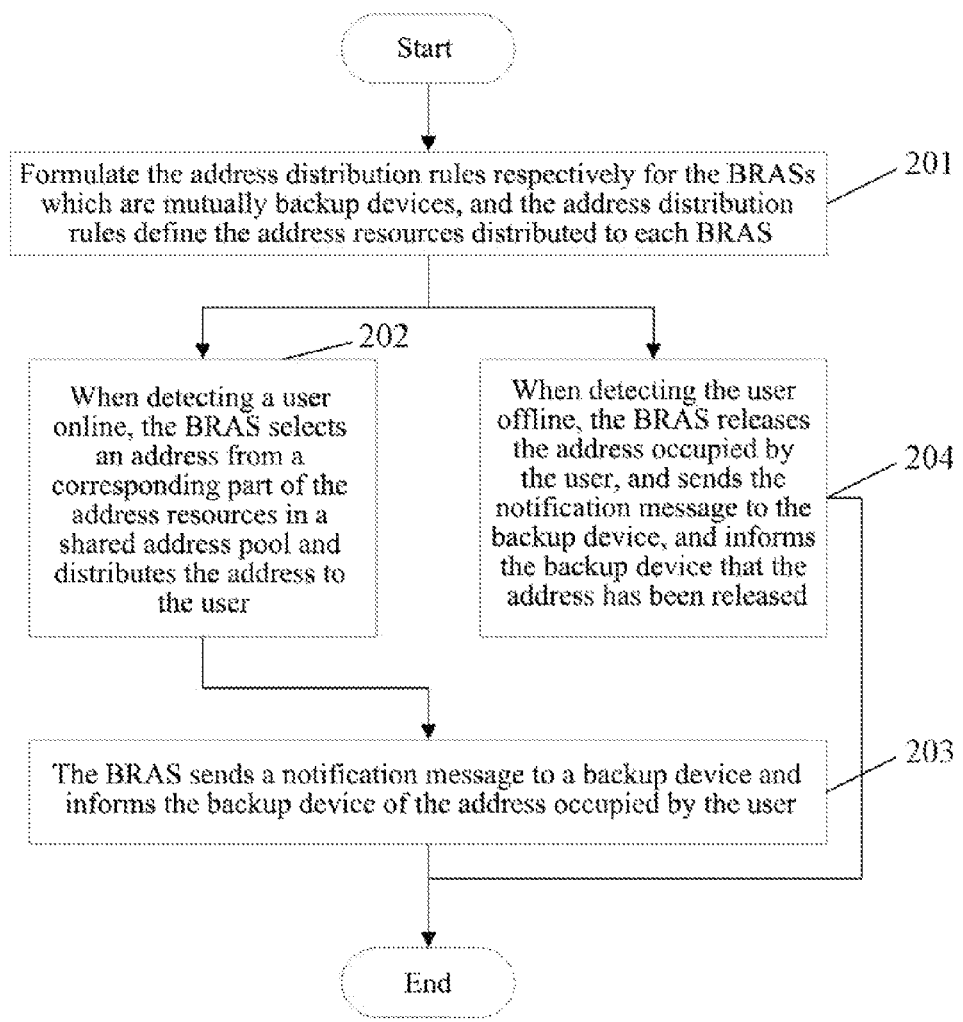
FIG. 2 is a flow chart of the address distribution method provided by the example according to the present invention.

When working in the 1+1 mode, if there are accesses of users simultaneously in a certain period and there is no mechanism as a guarantee, two BRAS devices will distribute the same address to the users. In order to solve the problem, an address distribution method is provided by the example of the present invention, and the flow of using the method to complete the address distribution is shown in FIG. 2, which comprises:

Step 201, address distribution rules are formulated respectively for the BRASs which are mutually backup devices, and the address distribution rules define the address resources distributed to each BRAS.

In the step, different address distribution rules are configured for BRAS102 and BRAS103 respectively through Operation Administration and Maintenance (OAM) system, and the BRAS is indicated to manage the addresses in the shared address pool according to the address distribution rules.

For example, the addresses are sequenced according to an ascending order from smallest to biggest, and the address distribution rules are formulated respectively for BRAS102 and BRAS103, such as the address distribution mode of BRAS102 is defined to be forward sequence distribution and the address distribution mode of BRAS103 to be reverse sequence distribution.

Step 202, when detecting a user online, the BRAS selects an address from the corresponding part of the address resources in the shared address pool and distributes the address to the user.

In the step, when BRAS102 detects that there is a user online under BRAS102, the BRAS102 selects an address from the shared address pool according to the address distribution rules of the forward sequence distribution and distribute the address to the user.

Step 203, the BRAS sends a notification message to a backup device and informs the backup device of the address occupied by the user.

In the step, after the user completes getting online, the BRAS102 sends the notification message to the backup device of the BRAS, namely the BRAS103, and synchronizes the address information occupied by the user to the BRAS103.

The BRAS103 generates user backup information according to the received notification message, and identifies the address occupied by the user as used in a shared address pool record of the BRAS103.

The specific step of releasing the address occupied by the user when the user is offline is as follows.

Step 204, when detecting the user offline, the BRAS releases the address occupied by the user, and sends the notification message to the backup device, and informs the backup device that the address has been released.

In the step, after the user is offline, the BRAS102 sends the notification message to the backup device of the BRAS, namely the BRAS103, and informs the BRAS103 to release the address occupied by the user.

The BRAS103 deletes the user backup information corresponding to the user according to the received notification message, and identifies the address occupied by the user as available in a shared address pool record of the BRAS103.

In addition, after the user accesses BRAS102 and if the abnormity of the downlink of BRAS102 occurs, the accessed user on BRAS102 is switched to BRAS103, and when the user is offline, the offline event is handled in the BRAS103.

The process of distributing and releasing the addresses for the users who gain access to getting online from the BRAS103 is the same as the principle of the processes described in steps 201~204, and only the BRAS103 uses the reverse sequence when distributing the addresses according to the address distribution rules formulated in the step 201.

An address distribution method is provided by the example of the present invention, in which part of the address resources in the shared address pool are distributed respectively for a pair of BRASs which are mutually backup devices, and the two BRAS devices are designated to select and distribute the addresses to the users in modes of forward sequence and reverse sequence, and the notification messages are sent to the backup devices and the addresses occupied by the users are informed to the backup devices, and thereby the problem of address collision generated when a pair of BRASs which are mutually backup devices distribute addresses to their respective users in the scenario of dual-server hot backup is solved.

Figure 3:
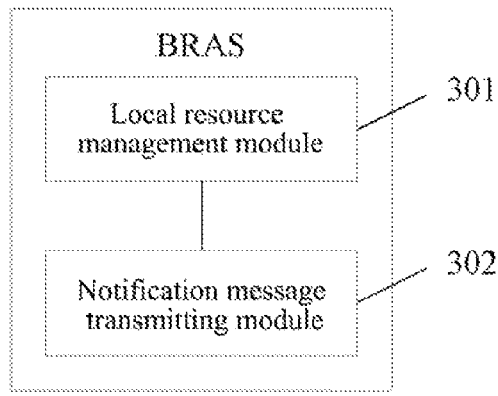
FIG. 3 is a structural schematic diagram of a BRAS provided by the example according to the present invention.

A BRAS is further provided by the example of the present invention, and as shown in FIG. 3, which comprises:

a local resource management module 301 is configured to select an address from a corresponding part of address resources in the shared address pool according to address distribution rules and distribute the address to the user when detecting the user online;

a notification message transmitting module 302 is configured to send a notification message to a backup device and inform the backup device of the address occupied by the user after the local resource management module 301 finishes distributing the address to the online user.

Furthermore, the local resource management module 301 is further configured to release the address occupied by the user, send the notification message to the backup device through the notification message transmitting module 302 and inform the backup device that the address has been released, when detecting the user offline.

Furthermore, the local resource management module 301 is further configured to receive the notification message, and if the notification message includes the address distributed for the user, identify the address distributed for the user as used; or, if the notification message indicates that the address occupied by the user has been released, identify the address occupied by the user as available.

Figure 4:
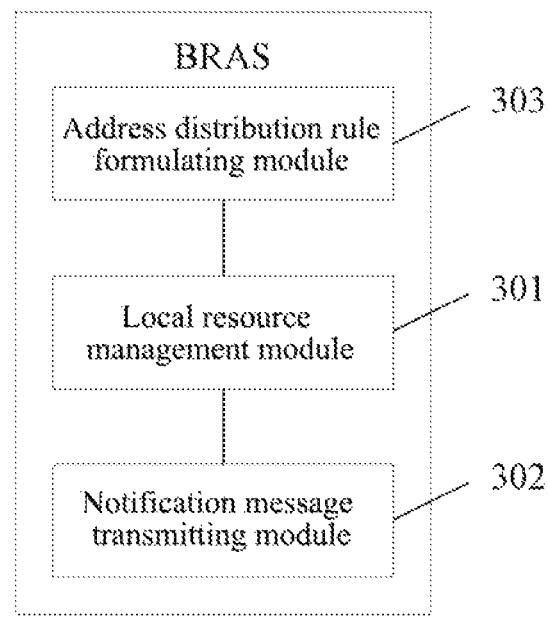
FIG. 4 is a structural schematic diagram of a BRAS provided by another example according to the present invention.

Furthermore, the above BRAS as shown in FIG. 4 further comprises:

an address distribution rule formulating module 303 is configured to formulate the address distribution rules respectively for BRASs which are mutually backup devices, wherein the address distribution rules define the address resources distributed to each BRAS.

Figure 5:
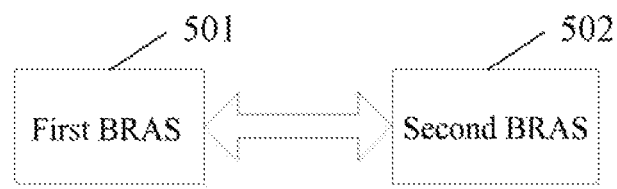
FIG. 5 is a structural schematic diagram of the address distribution system provided by the example according to the present invention.

An address distribution system is further provided by the example of the present invention, and as shown in FIG. 5, it comprises a first BRAS 501 and a second BRAS 502; wherein, the first BRAS 501 and second BRAS 502 are mutually backup devices;

the first BRAS 501 is configured to: select an address from a corresponding part of address resources in a shared address pool according to address distribution rules and distribute the address to the user, and send a notification message to the second BRAS 502 and inform the second BRAS 502 of the address occupied by the user, when detecting a user online;

the second BRAS 502 is configured to: receive the notification message sent by the first BRAS 501, and identify the address distributed for the user as used. The first BRAS 501 is further configured to: release the address occupied by the user, send the notification message to the second BRAS 502 and inform that the address has been released, when detecting the user offline;

the second BRAS 502 is further configured to: identify the released address as available.

The above BRAS and the address distribution system can be combined with an address distribution method provided by the example of the present invention, which respectively distributes part of address resources in the shared address pool for a pair of BRASs which are mutually backup devices, and when detecting the user online, the BRAS selects the address from the corresponding part of the address resources in the shared address pool which is allocated for the BRAS and distributes the address to the user, and sends the notification message to the backup device and informs the backup device of the address occupied by the user, which solves the problem of address collision generated when a pair of BRASs which are mutually backup devices distribute the addresses to their respective user in the scenario of dual-server hot backup.

The ordinary person skilled in the art can understand that the implementation of all of or part of the steps included in the above method of the examples can be completed through the program instructing the related hardware, and the program can be stored in a kind of computer readable memory medium. When running the program, one of the steps or a combination of the steps of the method examples is included.

Furthermore, each function unit in each example of the present invention can be implemented by using a form of hardware, and also can be implemented by using a form of software function module. If implemented in the form of software function module and sold or used as an independent product, the integrated module can also be stored in a computer readable memory medium.

The memory medium mentioned above can be a read-only memory, disk or optical disk, etc.

The above description is only the specific embodiments of the present invention, however, the protection scope of the present invention is not limited to this, any person skilled in the art can easily think of the changes and replacements within the technical scope disclosed by the present invention, and all these changes and replacements should fall into the protection scope of the present invention. Therefore, the protection scope of the present invention should be subject to the protection scope described in the claims.

INDUSTRIAL APPLICABILITY

The examples of the present invention provide an address distribution method, device, and system thereof, which respectively designate the address distribution rules for a pair of BRASs which are mutually backup devices, and the BRAS distributes the address resources in a shared address pool according to the address distribution rules, and when detecting a user online, the BRAS selects an address from a corresponding part of the address resources in the shared address pool which is allocated for the BRAS and distributes the address to the user, and sends a notification message to the backup device and informs the backup device of the address occupied by the user, which solves the problem of address collision generated when a pair of BRASs which are mutually backup devices distribute addresses to their respective user in the scenario of dual-server hot backup.

What is claimed is:

1. A Broadband Remote Access Server (BRAS) address distribution method comprising:
   two BRASs are mutually backup devices for each other and mutually backup each other, each of the said two BRASs occupy part of address resources in a shared address pool; wherein addresses occupied by one BRAS are different from addresses occupied by other BRAS;
   when detecting a user online, a BRAS selecting an address from a corresponding part of address resources in the shared address pool and distributing the address to the user; and
   the BRAS sending a notification message to a backup device of the BRAS, and informing the backup device of the address occupied by the user;
   wherein the method further comprises:
   formulating address distribution rules for the two BRASs to define the address resources distributed to each BRAS in following ways:
   sequencing addresses in the shared address pool; and
   defining one BRAS of said two BRASs to distribute the addresses in the shared address pool for online users on said BRAS in a mode of forward sequence distribution from lower address to higher address in the shared address pool, and the other BRAS of said two BRASs to distribute the addresses in the shared address pool for online users on said other BRAS in a mode of reverse sequence distribution from higher address to lower address in the shared address pool, wherein the distributed addresses in the mode of forward sequence distribution do not overlap with the distributed addresses in the mode of reverse sequence distribution.

2. The address distribution method according to claim 1, further comprising:
   when detecting the user offline, the BRAS releasing the address occupied by the user, and sending the notification message to the backup device, and informing the backup device that the address has been released.

3. The address distribution method according to claim 1, further comprising:
   the BRAS receiving the notification message; and
   if the notification message includes the address distributed for the user, identifying the address distributed for the user as used; or,
   if the notification message indicates that the address occupied by the user has been released, identifying the address occupied by the user as available.

4. A Broadband Remote Access Server (BRAS), comprising at least one processor and a storage medium, wherein the storage medium stores:
   a local resource management module (301), configured to select an address from a corresponding part of address resources in a shared address pool and distribute the address to a user according to address distribution rules, when detecting the user online; and
   a notification message transmitting module (302), configured to send a notification message to a backup device and inform the backup device of the address occupied by the user after the local resource management module finishes distributing the address to an online user;
   an address distribution rule formulating module, configured to formulate an address distribution rule respectively for two BRASs which are mutually backup devices and mutually backup each other, wherein the address distribution rule define the address resources distributed to each BRAS; each of the two BRASs occupy part of address resources in the shared address pool; wherein addresses occupied by one BRAS are different from addresses occupied by other BRAS;
   wherein the address distribution rule comprises:
   sequencing addresses in the shared address pool; and
   defining one BRAS of said two BRASs to distribute the addresses in the shared address pool for online users on said BRAS in a mode of forward sequence distribution from lower address to higher address in the shared address pool, and the other BRAS of said two BRASs to distribute the addresses in the shared address pool for online users on said other BRAS in a mode of reverse sequence distribution from higher address to lower address in the shared address pool, wherein the distributed addresses in the mode of forward sequence distribution do not overlap with the distributed addresses in the mode of reverse sequence distribution.

5. The BRAS according to claim 4, wherein,
   the local resource management module (301) is further configured to release the address occupied by the user, send the notification message to the backup device through the notification message transmitting module (302) and inform the backup device that the address has been released, when detecting the user offline.

6. The BRAS according to claim 4, wherein,
   the local resource management module (301) is further configured to:
   receive the notification message; if the notification message includes the address distributed for the user, identify the address distributed for the user as used; or, if the notification message indicates that the address occupied by the user has been released, identify the address occupied by the user as available.

7. An address distribution system, comprising a first Broadband Remote Access Server (BRAS) (501) and a second BRAS (502) which are mutually backup; wherein the first BRAS comprises at least one processor and a storage medium, the second BRAS comprise at least one processor and a storage medium;

the first BRAS (501) is configured to select an address from a corresponding part of address resources in a shared address pool and distribute the address to a user according to address distribution rules, and send a notification message to the second BRAS (502) and inform the second BRAS (502) of the address occupied by the user when detecting the user online;

the second BRAS (502) is configured to receive the notification message sent by the first BRAS (501), and identify the address distributed for the user as used; wherein, each of the first BRAS and second BRAS occupy part of address resources in a shared address pool; wherein addresses occupied by the first BRAS are different from addresses occupied by the second BRAS;

wherein the address distribution system further comprises an address distribution rule, the address distribution rule comprises:

sequencing addresses in the shared address pool; and defining one BRAS of the first BRAS and second BRAS to distribute the addresses in the shared address pool for online users on said BRAS in a mode of forward sequence distribution from lower address to higher address in the shared address pool, and the other BRAS of the first BRAS and second BRAS to distribute the addresses in the shared address pool for online users on said other BRAS in a mode of reverse sequence distribution from higher address to lower address in the shared address pool, wherein the distributed addresses in the mode of forward sequence distribution do not overlap with the distributed addresses in the mode of reverse sequence distribution.

8. The system according to claim 7, wherein, the first BRAS (501) is further configured to release the address occupied by the user, send the notification message to the second BRAS (502) and inform that the address has been released, when detecting the user offline;

the second BRAS (502) is further configured to identify the released address as available.

9. The BRAS according to claim 5, wherein, the local resource management module (301) is further configured to:

receive the notification message; if the notification message includes the address distributed for the user, identify the address distributed for the user as used; or, if the notification message indicates that the address occupied by the user has been released, identify the address occupied by the user as available.

* * * * *